United States Patent [19]

Tachibana

[11] 4,456,842
[45] Jun. 26, 1984

[54] DEVICE FOR COOLING SALIENT-TYPE ROTOR BY VENTILATION

[75] Inventor: Kouji Tachibana, Kobe, Japan

[73] Assignee: Mitsubishi Denki Kabushiki Kaisha, Tokyo, Japan

[21] Appl. No.: 384,174

[22] Filed: Jun. 2, 1982

[30] Foreign Application Priority Data

Jun. 9, 1981 [JP] Japan .................. 56-85734[U]

[51] Int. Cl.³ .................................................. H02K 1/32
[52] U.S. Cl. .................................... 310/61; 310/59; 310/269
[58] Field of Search ............ 310/269, 61, 62, 63, 310/264, 265, 60 R, 60 A, 52, 58, 59, 64, 65

[56] References Cited

U.S. PATENT DOCUMENTS

| | | | |
|---|---|---|---|
| 972,850 | 10/1910 | Gray | 310/60 A |
| 3,463,952 | 8/1969 | Norris | 310/269 |
| 3,846,651 | 11/1974 | Mishra | 310/269 |
| 4,020,373 | 4/1977 | Yamamoto | 310/269 |
| 4,118,646 | 10/1978 | Fleming | 310/269 |
| 4,182,966 | 1/1980 | Mishra | 310/269 |
| 4,264,836 | 4/1981 | Ducshtau | 310/269 |
| 4,306,165 | 12/1981 | Kitabayashi | 310/269 |

FOREIGN PATENT DOCUMENTS

| | | |
|---|---|---|
| 54-18001 | 2/1979 | Japan . |
| 54-23212 | 2/1979 | Japan . |
| 55-79645 | 6/1980 | Japan . |

*Primary Examiner*—R. Skudy
*Attorney, Agent, or Firm*—Wenderoth, Lind & Ponack

[57] ABSTRACT

A device for cooling a salient-type rotor by ventilation, in which ventilation ducts are formed in the radial direction in the magnetic cores on both sides thereof relative to the circumferential direction so as to communicate with the ventilation ducts in the rim. The cooling air supplied through the ventilation ducts in the rim is also permitted to flow through the ventilation ducts in the magnetic cores between the adjacent cores so that the ventilation resistance is reduced, the stator coils and the stator cores are efficiently cooled, and the field coils wound around the magnetic cores are efficiently cooled from the outer side and from the inner side thereof.

3 Claims, 4 Drawing Figures

DEVICE FOR COOLING SALIENT-TYPE ROTOR BY VENTILATION

BACKGROUND OF THE INVENTION

The present invention relates to a device for cooling a salient-type rotor of a rotary machine such as a synchronous machine by ventilation.

A conventional device for cooling a salient-type rotor of a synchronous machine by ventilation is shown in the vertical section view of FIG. 1 and in the horizontal section view of FIG. 2. These drawings show a vertical-shaft rotary machine, in which reference numeral 1 denotes a rotary shaft, reference numeral 2 denotes a rotor spider, reference numeral 3 denotes a rim which is inserted and secured into the rotor spider and which forms a yoke of the rotor and reference numeral 4, denotes a plurality of ventilation ducts formed in the rim in the radial direction of which the ventilation gap is defined by a plurality of duct pieces 5 and spacer rings 6. Reference numeral 7 denotes bolts for fastening the rim 3, reference numeral 8 denotes nuts, reference numeral 9 denotes a plurality of salient magnetic cores which are made up of a laminate of thin steel plates, which are fastened together by bolts 10, and which are fastened to the outer periphery of the rim 3, reference numeral 11 denotes field coils fitted to the magnetic cores, and reference numeral 12 denotes a fan mounted on the rim 3.

When the rotor rotates, the fan 12 directs the cooling air as indicated by arrow A to cool end portions of the field coils 11, whereby part of the cooling air flows among the field coils 11 as indicated by arrow B, and another part of the cooling air flows through the ends of the stator coils (not shown) as indicated by arrow C to cool them. Further, the cooling air which has entered into the inner side of the rotor spider 2 flows through the ventilation ducts 4 as indicated by arrows D, and flows through the neighboring field coils 11 as indicated by arrows E to cool them. Being assisted by the function of the fan, the cooling air flowing through the field coils 11 passes through ventilation ducts of the stator via air gap G, thereby to cool the stator coils and the stator cores (which are not shown).

In the above-mentioned ventilation cooling device, peripheries of the field coils 11 all face to the magnetic cores 9 and are poorly cooled. Further, flow of the cooling air through ventilation ducts 4 in the rim 3 is hindered by the narrowness of the space along the flow path at the lower portions of the neighboring field coils 11. Therefore, ventilation resistance is increased, the blowing amount of cooling air blown through the field coils and ventilation ducts is decreased, and the stator coils and the stator cores are not sufficiently cooled.

SUMMARY OF THE INVENTION

The object of the present invention is to provide a device for cooling a salient-type rotor by ventilation, in which ventilation ducts are formed in the magnetic cores on both sides in the radial direction, the ventilation ducts communicate with the ventilation ducts in the rim in the radial direction, to effectively cool the field coils by the cooling air blown through the ventilation ducts in the rim, and whereby the cross sectional areas of the magnetic paths of the magnetic cores are reduced little by the ventilation ducts.

PREFERRED EMBODIMENT OF THE INVENTION

The object of the present invention is to provide a device for cooling a salient-type rotor by ventilation in order to effectively cool the field coils, while eliminating the defects inherent in the conventional devices.

Figure 1:
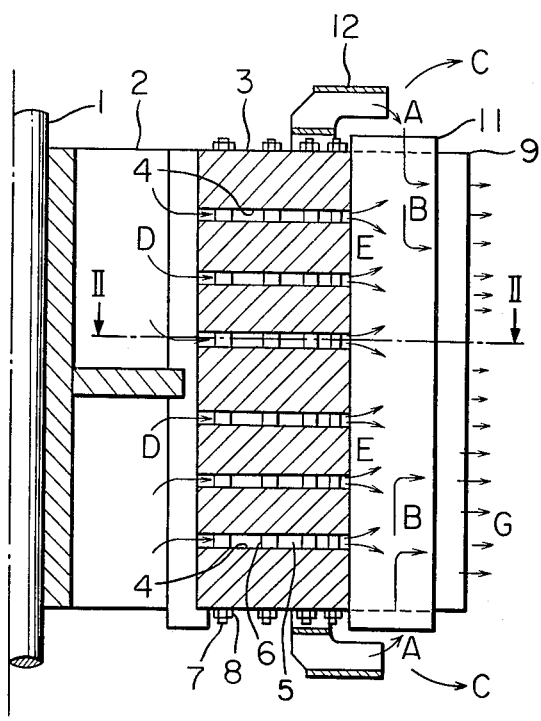
FIG. 1 is a vertical section view of a conventional device for cooling salient-type rotor by ventilation.
Figure 2:
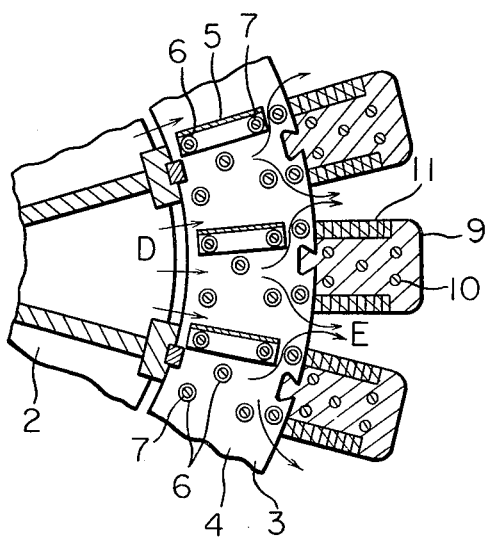
FIG. 2 is a section view along the line II—II of FIG. 1.
Figure 3:
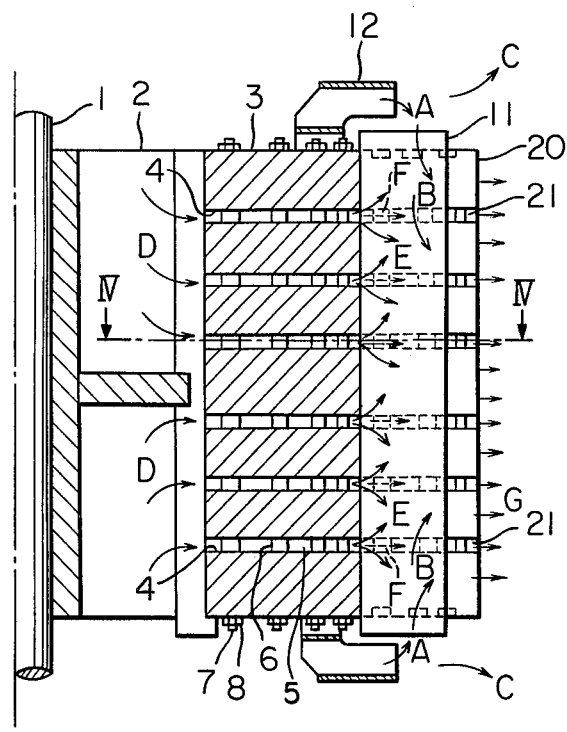
FIG. 3 is a vertical section view of a device for cooling a salient-type rotor by ventilation according to an embodiment of the present invention.
Figure 4:
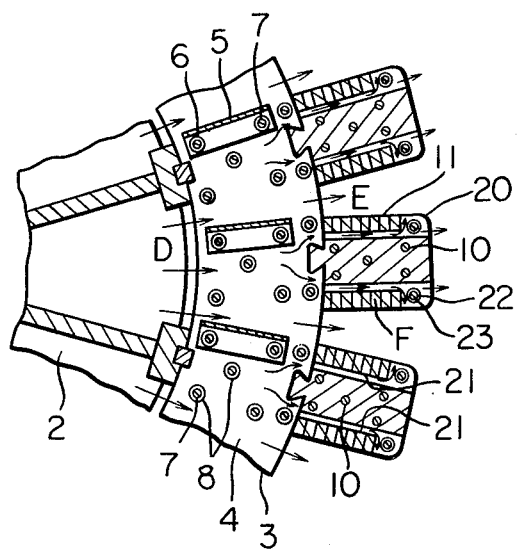
FIG. 4 is a section view along the line IV—IV of FIG. 3.

FIGS. 3 and 4 are respectively a vertical section view and a horizontal section view illustrating a device for cooling a salient-type rotor by ventilation according to an embodiment of the present invention, in which reference numerals 1 to 8, and 10 to 12 denote the same members as those of the aforementioned conventional device. Reference numeral 20 denotes a plurality of magnetic cores composed of a laminate of thin steel plates, which are fastened to the outer periphery of the rim 3, and reference numeral 21 denotes ventilation ducts that are formed when thin steel plates having wide areas and narrow areas are laminated to constitute magnetic cores. The ventilation ducts are formed on boyth sides of the magnetic cores relative to the circumferential direction and communicate with the ventilation ducts 4 in the rim in the radial direction. Reference numeral 22 denotes bolts for fastening the head portion of the magnetic core 20 on both sides, and reference numeral 23 denotes spacer rings which are arrayed in the ventilation ducts 21 and are fitted to the fastening bolts 22.

In the device of the above-mentioned embodiment, the cooling air which is driven by the rotor into the inner side of the rotor spider 2, flows through the ventilation ducts 4 as indicated by arrow D, whereby part of the air directly flows into the ventilation ducts 21 in the magnetic cores 20 as indicated by arrow F, and flows into the air gap G while cooling the field coils 11 from the inner side. Another part of the cooling air which has passed through the ventilation ducts 4 flows through spaces between the neighboring field coils 11, that is, the spaces between adjacent magnetic cores 20 externally of the field coils 11, as indicated by arrows E. The stream of cooling air produced by the fan 12 flows in the same manner as in the conventional device.

Thus, the cooling air which flows through the ventilation ducts 4 of the rim 3 also flows through the ventilation ducts 21 in the magnetic cores 20. Therefore, sectional areas of the air path are increased, the ventilation resistance is decreased, and the amount of ventilation is increased. The field coils 11 are cooled not only from the outer side but also from the inner side, and are, hence, cooled more effectively. The magnetic core 20 has ventilation ducts 21 which run on both sides but not in the middle portion relative to the circumferential direction. Therefore, presence of the ventilation ducts 21 does not substantially decrease the sectional areas of the magnetic path. Further, the force fastening the core is not decreased, duct pieces are not required, and the ventilation ducts 21 can be easily formed.

Furthermore, since the cooling air flows in increased amounts, the air flows into the ventilation ducts in the stator in increased amounts, and the stator coils and the stator cores are cooled more efficiently.

What is claimed is:

1. A device for cooling a salient-type rotor by ventilation, comprising a rim which serves as a yoke of the rotor and which has first radially extending ventilation ducts for carrying cooling air therethrough, and a plurality of spaced magnetic cores which are provided with field coils, said magnetic cores being mounted on the periphery of said rim such that spaces are defined between adjacent ones of said magnetic cores externally of said field coils, said magnetic cores having second ventilation ducts on both sides thereof relative to the circumferential direction of said rim between the outer peripheries of said magnetic cores and the inner peripheries of said field coils opening radially at the radially outermost end of said field coils, said first ventilation ducts communicating in the radial direction of said rim with said second vantilation ducts and with said spaces, wherein the cooling air which flows through said first ventilation ducts also flows entirely through said second ventilation ducts and through said spaces in parallel with said second ventilation ducts, such that said field coils are cooled from the outer side and from the inner side thereof.

2. A device for a cooling salient-type rotor according to claim 1, wherein said magnetic cores are formed from laminated thin steel plates therein.

3. A device for cooling a salient-type rotor as in claim 2 wherein said thin steel plates have wide areas and narrow areas and said second ventilation ducts are formed therebetween.

* * * * *